(12) United States Patent
Maddison et al.

(10) Patent No.: US 7,923,643 B2
(45) Date of Patent: Apr. 12, 2011

(54) SEPARATOR FOR SEPARATING WINDINGS

(75) Inventors: Christopher Paul Maddison, Lincolnshire (GB); Mark Jason Riley, Leicester (GB); Martin Shanel, Lincolnshire (GB); Joseph William Saunders, Lincolnshire (GB); Peter Francis Hanwell, Lincolnshire (GB); Adrian Norman Gee, Grantham (GB)

(73) Assignee: Cummins Generator Technologies Limited, Stamford (GB)

( * ) Notice: Subject to any disclaimer, the term of this patent is extended or adjusted under 35 U.S.C. 154(b) by 947 days.

(21) Appl. No.: 11/810,529

(22) Filed: Jun. 6, 2007

(65) Prior Publication Data
US 2008/0011505 A1 Jan. 17, 2008

(30) Foreign Application Priority Data
Jun. 6, 2006 (GB) ................................ 0611149.6

(51) Int. Cl.
*H02G 7/12* (2006.01)
*B65H 81/06* (2006.01)

(52) U.S. Cl. .................... 174/146; 174/147; 174/149 R; 242/140; 242/430

(58) Field of Classification Search .................. 174/146, 174/147, 149 R, 135, 137; 242/140, 430; 361/600, 601, 676, 679.01, 688; 310/180, 184, 208, 198
See application file for complete search history.

(56) References Cited

U.S. PATENT DOCUMENTS

| | | | | |
|---|---|---|---|---|
| 3,947,623 A | * | 3/1976 | Williams | 174/146 |
| 5,636,434 A | * | 6/1997 | Okey et al. | 310/208 |

FOREIGN PATENT DOCUMENTS

| | | |
|---|---|---|
| CH | 312 388 | 12/1955 |
| DE | 11 56 171 | 10/1963 |
| DE | 11 89 599 | 3/1965 |
| JP | 59 010148 | 1/1984 |
| JP | 2002 142398 | 5/2002 |

OTHER PUBLICATIONS

European Search Report dated Feb. 15, 2007.

* cited by examiner

*Primary Examiner* — Angel R Estrada
(74) *Attorney, Agent, or Firm* — Hamre, Schumann, Mueller & Larson, P.C.; J. Bruce Schelkopf

(57) ABSTRACT

A separator is disclosed which provides an electrically insulating layer between groups of windings in an electrical apparatus, such as a rotating electrical machine. The separator comprises a matrix of interconnected rods. This can allow air gaps to be present between groups of windings, which may improve the cooling efficiency of the apparatus.

29 Claims, 4 Drawing Sheets

SEPARATOR FOR SEPARATING WINDINGS

BACKGROUND TO THE INVENTION

The present invention relates to a separator for separating windings in an electrical apparatus.

Electrical apparatuses such as motors, generators and transformers generally comprise electrical windings wound on an iron core. The individual wires in the windings are electrically insulated by means of an outer insulation layer, which is typically enamel. However faults may develop in the outer insulation layer either due to the manufacturing process, or due to stresses imposed on the wires during construction or use of the apparatus.

Many electrical machines are constructed with overlapping groups of windings. For example, in a three phase motor or generator each phase many have one or more groups of windings, and each group may overlap another group. In such a machine, overlapping groups of windings may be at different electrical potentials. Any faults in the insulation in the wires could then lead to arcing between the groups. This would make the machine inefficient and could lead to the eventual destruction of the machine.

In order to prevent arcing between groups of windings, it is known to insert electrically insulating composite paper between the groups of windings. This composite paper typically comprises layers of Aramid and Mylar materials in varying thicknesses, depending on the physical and electrical requirements of any given application.

In electrical machines heat tends to be generated through, amongst other things, resistance in the windings and losses in the iron. The machine rating is often determined by the actual temperature rise of the machine, and thus the cooling efficiency of the construction may help to determine the rating of the machine.

A problem which has been identified in machines which use composite paper between groups of windings is that the paper may reduce the cooling efficiency of the machine. This is firstly because the exposed surface area of the windings may be reduced, and secondly because air flow through the windings may be restricted.

SUMMARY OF THE INVENTION

According to a first aspect of the present invention there is provided a separator which provides an electrically insulating layer between groups of windings in an electrical apparatus, the separator comprising a matrix of interconnected rods.

Constructing a separator from a matrix of rods can allow the separator to have holes passing through the plane of the separator. This can allow air gaps to be present between groups of windings, which may increase the exposed surface area of the windings. In addition, air may pass through the plane of the separator, thereby allowing greater air flow through the windings. This may improve the cooling efficiency of the apparatus.

The matrix may comprise a plurality of cells, each defining a hole through the separator. Each cell may be of any shape, such as square, rectangular, triangular, honey-combed (hexagonal) or any other shape. The matrix may comprise two or more cells of different shapes.

Preferably the rods are connected by a plurality of joints. A joint may have a narrower cross-section than a rod. A joint may be integrally formed with a rod, preferably from the same material. This may allow the separator to be manufactured simply and conveniently.

At least one joint may connect the ends of three or more rods. For example, where the cells are square or rectangular, the joints in the middle of the separator may connect the ends of four rods, while those at the edges may connect the ends of two or three rods. It will be appreciated that the number of rods which are connected by a joint will depend on the chosen layout of the matrix.

In some circumstances, the separator may be pre-formed into a desired final shape, which may be for example flat or curved. However, in many situations it may be desirable for the separator to be flexible, so that it may adapt to the shape of the windings which it is to separate. Thus at least one of the joints may be flexible. This may allow the separator to bend in one or more planes, which may enable the separator to follow the contours of the windings being electrically separated.

The matrix may comprise a plurality of rods connected end to end. For example, each cell may be formed from rods having lengths corresponding to the size of a cell, and connected end to end. Alternatively, or in addition, the matrix may comprise a plurality of intersecting rods. In this case each cell may be formed by the intersection of rods running in different directions.

As well as allowing air flow through the plane of the separator, it may be desirable to allow air flow in the plane of the separator. For example, where the separator is used to separate overlapping groups of windings in the stator of a rotating machine, it may be desirable to allow air to flow axially between the groups of windings. Thus the separator may have a varying thickness, which may allow air flow in the plane of the separator. The varying thickness may be achieved, for example, by using rods of varying thickness, or by connecting the rods at junctions which have a smaller cross section than that of the rods, or by forming the separator from overlaid rods, or some combination thereof, or in any other way.

Each rod may be of any desired shape. For example, a rod may have a circular, square, rectangular, triangular or hexagonal cross-section, or any other shape. The shape of a rod may vary along its length, and the matrix may comprise rods of different shapes.

In practice, the windings on the electrical apparatus may be formed by winding a first group of windings, then placing the separator on the first group of windings, and then winding a second group of windings on top of the separator. As part of the second step, it may be necessary to pull the second group of windings over the separator. In order to facilitate the movement of a group of windings over the separator, some or all of the rods may have a rounded upper surface. This may be achieved, for example, by using cylindrical rods, or rods with one or more flat surface and a rounded upper surface. It may also be desirable for the separator to be manufactured from a fairly low-friction material, or to have a low-friction coating.

Preferably the rods are compressively rigid. This may help to ensure that the groups of windings remain physically separated.

A problem which may be encountered when forming a group of windings on top of the separator is that the separator may move as the windings are being wound on or pulled over the separator. Thus the separator may further comprise a tag for holding the separator in position while a group of windings is being formed on the separator.

Where the separator has a tag, the tag may be arranged to stick to part of the apparatus. Thus the tag may carry an adhesive. The tag may be arranged to stick, for example, to the first group of windings or some other part of the apparatus. Where the windings are wound in a slot, the tag may be arranged to stick to a slot liner or a slot separator, which may be constructed from conventional composite paper.

The tag may be connected to the separator by means of a flexible joint, which may allow the tag to bend into a position where it can adhere to a suitable surface. Alternative, the tag may be formed integrally with a rod, which may provide a stronger connection. The tag may be formed with its upper or lower surface in the same plane as the bottom of the separator, which may avoid the need to bend the tag.

Preferably a plurality of tags are provided, which may help to ensure that the separator is held firmly in place. Various different types of tag may be provided on the same separator. The tags may run along all or part of one or more edges of the separator.

The separator may be constructed from a plastics material, preferably a high density plastics material. Preferably the material can withstand high temperatures, such as temperatures above 200° C.

The present invention extends to an electrical apparatus comprising two (or more) groups of windings separated by a separator in any of the forms described above.

The electrical apparatus may be any apparatus having groups of windings which it is desired to separate electrically. For example, the apparatus may have overlapping groups of windings. Each group of windings may be for example a different phase in a multi-phase apparatus such as a three phase machine.

Preferably the separator defines a plurality of air gaps between the groups of windings. In this case, electrical insulation between groups of windings is provided by virtue of the air gaps. It is desirable for the air gaps to be large enough for their electrical breakdown strength to be greater than or equal to the requirement for any anticipated potential difference between the groups of windings which they are separating. Thus the air gaps are preferably sufficient to ensure electrical separation of the groups of windings. For example, the air gaps may be sufficient to ensure electrical separation between groups of windings when the machine is operated at its maximum rating.

The thickness of the air gaps is determined partially by the thickness of the separator, and thus a relatively thick separator is desirable from the point of view of good electrical separation. However it is normally preferable to minimize the size of the apparatus, and increasing the thickness of the separator may add to the bulk of the apparatus. Thus the thickness of the separator is preferably sufficient to ensure electrical separation of the groups of windings, while at the same time avoiding adding unnecessary bulk to the apparatus.

The thickness of the air gaps is also partially determined by the size of the cells. This is because some drooping of the windings into the air gaps may take place, thereby reducing the size of the air gaps. The larger the size of a cell the more likely it is that windings will droop into the air gap. However, at the same time it is desirable for the cells to be as large as possible to allow greater air flow through the windings. Thus the cells are preferably small enough to ensure electrical separation of the groups of windings, while at the same time large enough to provide effective cooling.

In one example the electrical apparatus is a rotating electrical machine, such as a motor or a generator. In this case the groups of winding may be windings in the stator or the rotor of the machine. In another example the apparatus is a transformer, or any other wound electrical component.

According to a second aspect of the present invention there is provided a method of winding an electrical apparatus, the method comprising inserting a separator comprising a matrix of interconnected rods between groups of windings.

The method may comprise winding a first group of windings, placing the separator on the first group of windings, and then winding a second group of windings on the separator.

The method may further comprise sticking the separator to part of the apparatus. For example the separator may have one or more tags, and the method may comprise sticking one or more tags, for example, to the first group of windings or to a slot liner or a slot separator.

Any of the apparatus features may be provided as method features and vice versa.

BRIEF DESCRIPTION OF THE DRAWINGS

Preferred features of the present invention will now be described, purely by way of example, with reference to the accompanying drawings, in which.

DETAILED DESCRIPTION OF EMBODIMENTS OF THE INVENTION

An embodiment of the present invention relates to a separator for separating groups of windings in an electrical machine such as a generator or motor. In such a machine the stator is normally wound with a number of groups of windings. Normally the number of groups of windings is equal to the number of poles times the number of phases. For example, the stator of a four-pole, three-phase machine may carry twelve groups of windings. In order to achieve a compact design, the groups of windings often overlap with each other.

In a rotating electrical machine the stator normally acts as the armature and carries the main electrical power. Since windings of different phases may overlap with each other, considerable electrical potential may be present between overlapping groups of windings. This creates the need to separate groups of windings electrically. Previously this has been achieved by providing a layer of composite paper between groups of windings, or substantially increasing the thickness of the enamel coating on the wire.

The power rating of an electrical machine is often limited by the temperature rise of the stator and rotor when the machine is in use. Furthermore, machines generally operate more efficiently at lower temperatures. Thus many machines are arranged to have air flow forced through the machine, in order to cool the machine. However, if composite paper is placed between adjacent groups of windings, this may restrict the air flow through the windings.

Figure 1:
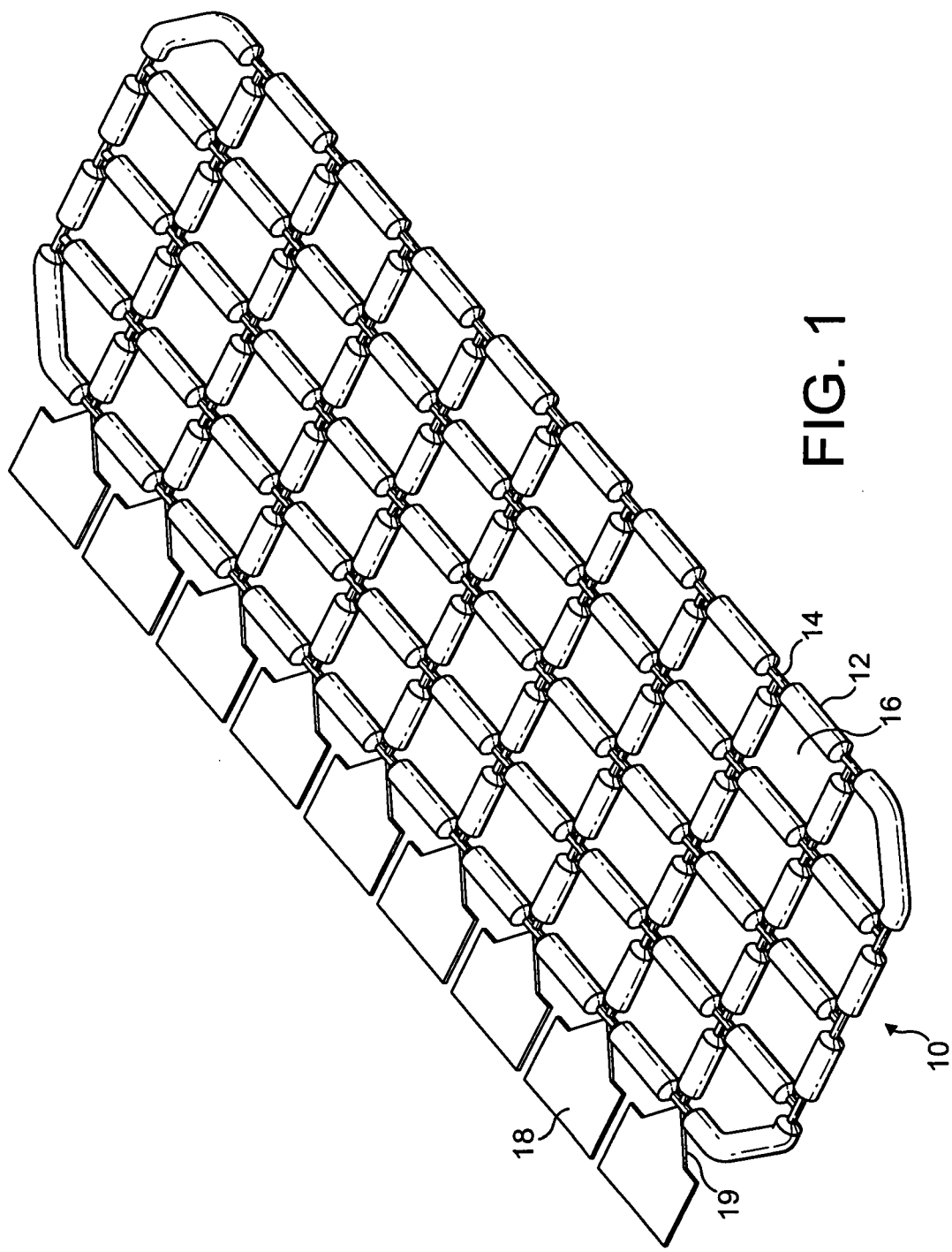
FIG. 1 shows a separator according to an embodiment of the invention.

FIG. 1 shows a separator 10 according to an embodiment of the invention. The separator comprises a frame constructed from a series of cells. Each cell is formed from a number of rigid rods 12 connected by means of flexible joints 14. This arrangement creates a separator having a number of holes 16.

In use, the separator 10 is placed between groups of windings in a machine. The holes 16 allow air to pass through the separator, thereby cooling the windings. The flexible joints 14 allow the separator to bend in two planes. This can allow the separator to follow the contours of the windings being separated.

The separator 10 shown in FIG. 1 also comprises a series of flags or tags 18. Each tag is connected by means of a flexible joint 19 to the separator. The tags are used to keep the separator in place while the windings are being wound on the machine. Each of the tags may be provided with adhesive, in order to hold the separator in place.

The location of the tags 18 on the separator is chosen so that, when the separator is in place, the tags are aligned with a surface to which they can be adhered. The flexible joint 19 can allow the tag to bend into a position where it can adhere to a suitable surface. In practice it has been found that, when winding the stator of a rotating machine, the composite paper which is typically used as a slot liner or slot separator may provide a convenient surface to which the tags may be adhered. Once the machine has been fully wound the windings themselves will usually hold the separator in place, and thus it may only be necessary for the adhesive to be strong enough to hold the separator in place during the winding process.

The separator 10 may be constructed from any suitable material having the necessary physical and electrical properties. It is desirable for the material to be non-conductive, to have a certain degree of flexibility, while being compressively rigid, and to have good thermal characteristics. It is also desirable for the material to be fairly low-friction, in order to allow groups of wires to be pulled over the separator during construction of the machine. In practice, high density plastics have been found to be suitable materials. The separator can be manufactured using injection molding.

In use, the separator 10 provides electrical insulation between groups of windings in the machine by virtue of the air gaps it enforces between the groups of windings. It is necessary for the air gap between two groups of windings to be large enough for its electrical breakdown strength to be greater than any anticipated potential difference between the groups of windings.

In practice the thickness of an air gap between two groups of windings is determined not only by the thickness of the separator, but also by the size of the cells. This is because some drooping of the windings into the holes may take place, and this will be more pronounced with a larger cell. However, from the point of view of increasing the air flow through the windings, it is desirable for the holes to be as large as possible. It is also desirable to limit the thickness of the separator, in order to avoid adding unnecessarily to the bulk of the machine. Thus the dimensions of the separator are a trade-off between these different factors.

It has been found that, for a typical machine, a separator of about 5 mm thickness and with cells of 20-25 mm across is suitable, although of course this will depend on the machine for which the separator is designed.

Although FIG. 1 shows a matrix of rectangular cells, it will be appreciated that other constructions are possible. For example, the cells could be square, triangular or hexagonal. It is not necessary for each cell to be the same as the others. For example, cells could be smaller in areas where greater stresses are anticipated (such as bends), and larger elsewhere. The separator may be designed so that flexible joints are present in areas where the separator is required to bend, and this may result in cells having varying dimensions and/or shapes.

Figure 2:
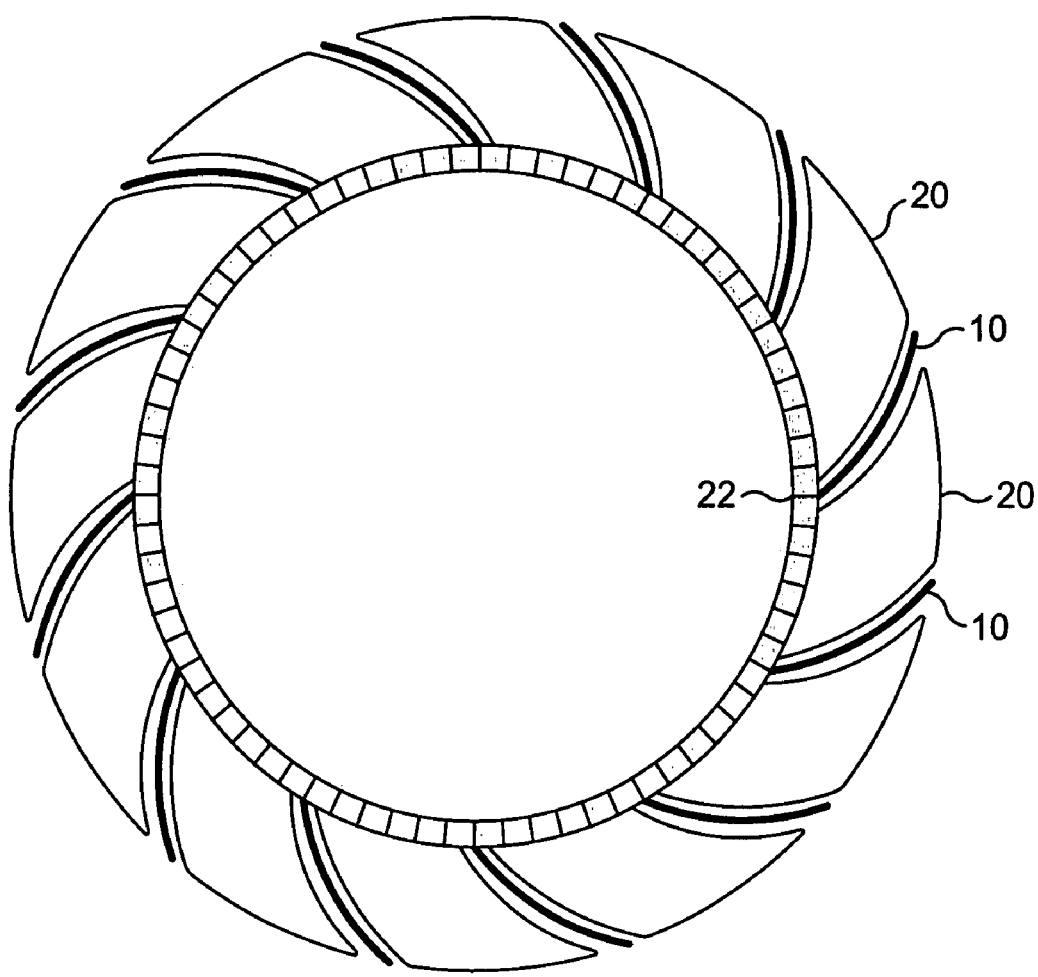
FIG. 2 shows parts of the stator of an electrical machine.

FIG. 2 shows parts of the stator of a four pole, three phase electrical machine. In FIG. 2, overlapping groups of windings 20 are wound on stator core 22. Each group of windings is separated from an adjacent group by means of a separator 10.

The electrical machine is provided with a fan (not shown). When the machine is in operation, the fan draws air axially through the bore of the machine, in a direction perpendicular to the plane of the paper in FIG. 2. This air flow through the bore of the machine causes air to be drawn from outside radially through the windings. The holes in the separators facilitate this air flow. This can allow the windings to be cooled more efficiently than if composite paper were used to separate the windings.

Figure 3:
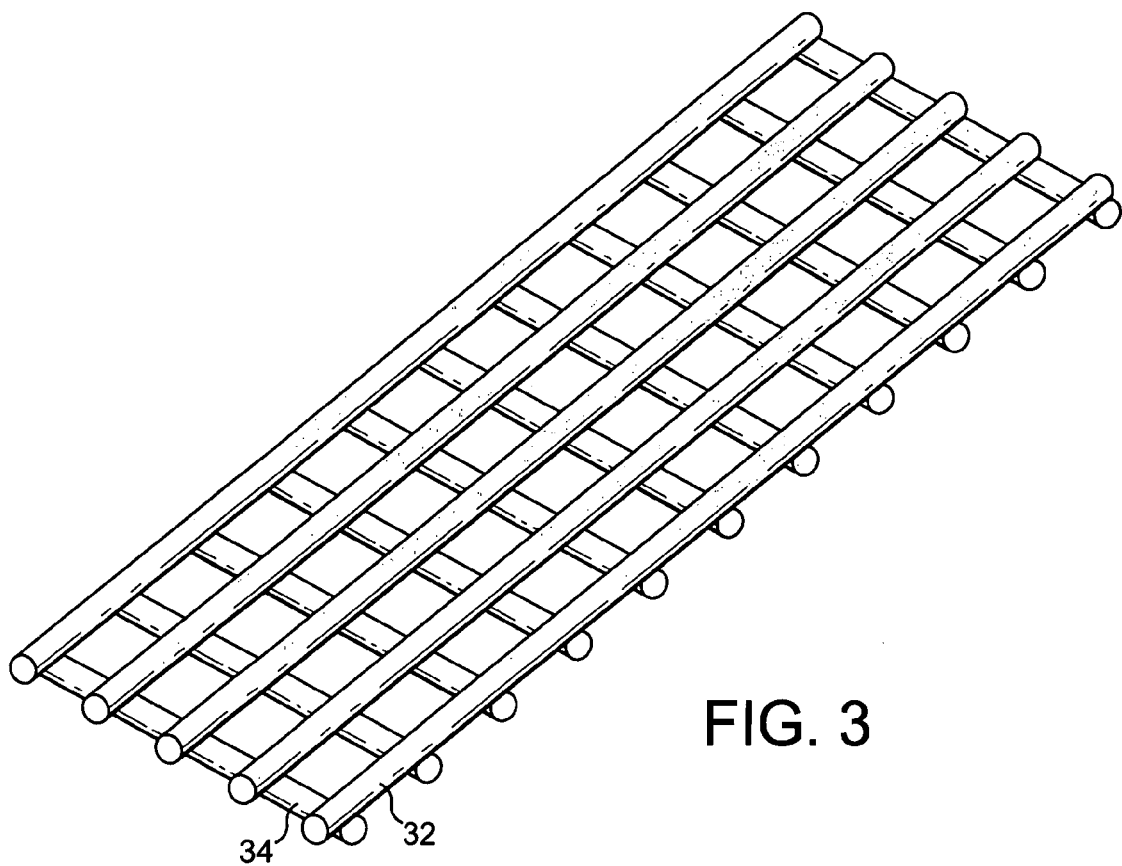
FIG. 3 shows a separator according to another embodiment of the invention.

FIG. 3 shows a separator according to another embodiment. In FIG. 3 the separator 30 is formed from a first set of rods 32 which run in one direction, and a second set of rods 34 which run in a direction perpendicular to the first set of rods. In FIG. 3, the first set of rods 32 is physically above the second set of rods 34, and the rods are joined at their intersection. The rods are designed to be sufficiently flexible to adapt to the contours of the windings which they are to separate, while being rigid enough to ensure the windings remain separated. Although not shown, tags similar to those in FIG. 1 could be provided to hold the separator in place during the winding process.

The separator shown in FIG. 3, when in place in a machine, provides air gaps in an axial direction as well as a radial direction. This can allow the flow of air axially through the windings, as well as radially. This arrangement may further enhance the cooling efficiency of the machine, at the cost of slightly greater bulk.

It will be appreciated that other arrangements could be used to provide air gaps in the axial direction. For example, in the arrangement of FIG. 1, some or all of the rods which run in a radial direction when the separator is in place could have a waist, that is, a part of smaller cross section than other parts of the rod. It will also be appreciated that the flexible joints of the separator in FIG. 1 may allow some degree of axial air flow, and the size of the flexible joints may be chosen accordingly.

Figure 4A:
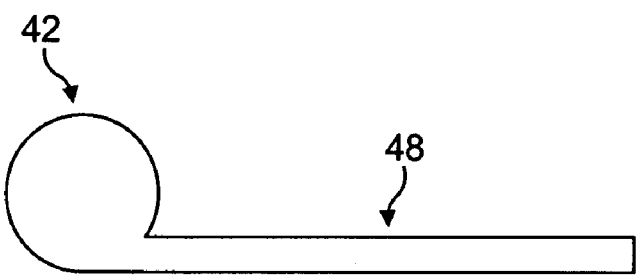
FIGS. 4A and 4B show a separator according to a further embodiment of the invention.
Figure 4B:
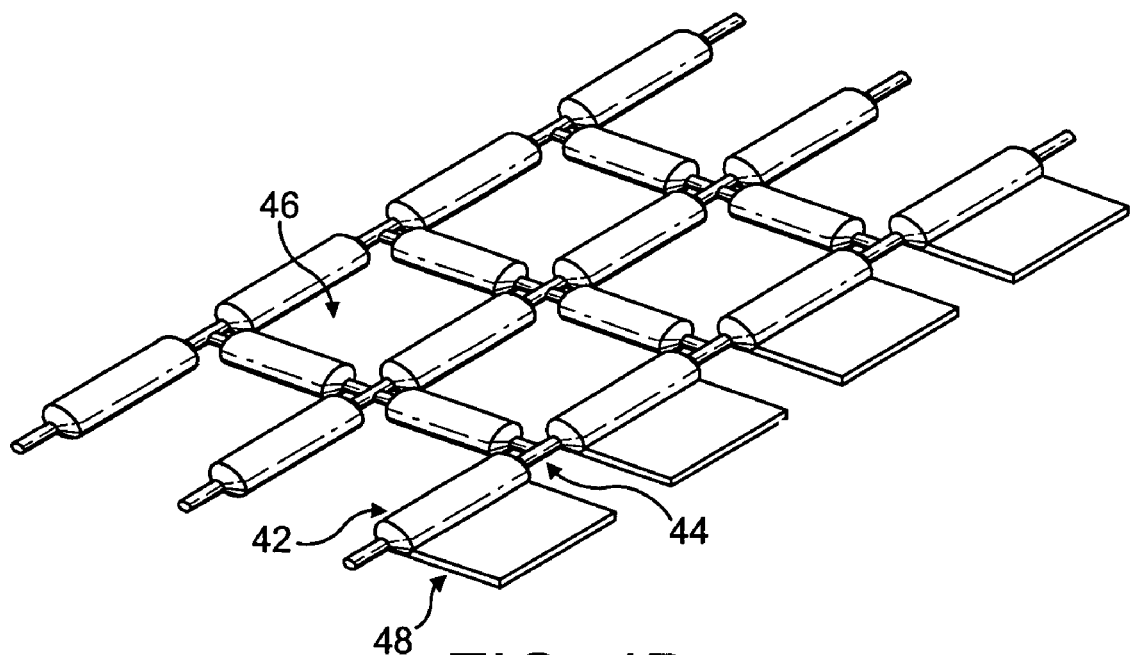

FIGS. 4A and 4B show parts of a separator according to a further embodiment. In this embodiment a tag 48 is formed as an integral part of a rod 42, as shown in FIG. 4A. The tags are provided along one edge of the separator, as shown in FIG. 4B. Referring to FIG. 4B, the separator comprises a plurality of rods 42 connected by means of flexible junctions 44, thereby forming holes 46.

In the embodiment shown in FIGS. 4A and 4B, the tags are formed in the same plane as one edge of the separator. This can allow the tags to come into contact with a surface to which they are to be adhered or otherwise connected without the need for bending. Furthermore, since each tag is formed integrally with a rod along one edge, a strong connection between the tag and the separator is achieved. This may reduce the risk of a tag breaking off, compared to the case where flexible joints are used to connect the tags.

In the arrangement of FIGS. 4A and 4B each tag may be provided with adhesive in the same way as the embodiment of FIG. 1.

While preferred features of the invention have been described with reference to specific embodiments, it will be appreciated that variations are possible within the scope of the invention. For example, features of one embodiment may be provided in combination with features of other embodiments. Furthermore, although embodiments of the invention have been described with reference to the stator of an electrical machine, it will be appreciated that the separator described herein can be used in any electrical apparatus in which it is desired to separate groups of windings.

What is claimed is:

1. An electrical apparatus, including a plurality of groups of windings at different electrical potentials, the electrical apparatus comprising a separator which provides an electrically insulating layer between groups of windings at different electrical potentials, the separator comprising a matrix of interconnected rods which defines a plurality of cells in two directions.

2. An electrical apparatus according to claim 1, wherein each cell defines a hole through the separator.

3. An electrical apparatus according to claim 1, wherein each side of a cell is formed from a rod.

4. An electrical apparatus according to claim 1, wherein the rods are connected by a plurality of joints.

5. An electrical apparatus according to claim 4, wherein a joint has a narrower cross-section than a rod.

6. An electrical apparatus according to claim 4, wherein a joint is integrally formed with a rod.

7. An electrical apparatus according to claim 4, wherein a joint is formed from the same material as a rod.

8. An electrical apparatus according to claim 4, wherein at least one joint connects the ends of at least three rods.

9. An electrical apparatus according to claim 4, wherein at least one joint is flexible.

10. An electrical apparatus according to claim 1, wherein the matrix comprises a plurality of rods connected end to end.

11. An electrical apparatus according to claim 1, wherein the matrix comprises a plurality of intersecting rods.

12. An electrical apparatus according to claim 1, wherein the separator is pre-formed into a desired final shape.

13. An electrical apparatus according to claim 1, wherein the separator is flexible.

14. An electrical apparatus according to claim 1, wherein the separator can bend in one or more planes.

15. An electrical apparatus according to claim 1, wherein the separator has a varying thickness.

16. An electrical apparatus according to claim 1, wherein at least one rod has a varying thickness.

17. An electrical apparatus according to claim 1, wherein at least one of the rods has a rounded upper surface.

18. An electrical apparatus according to claim 1, wherein the rods are compressively rigid.

19. An electrical apparatus according to claim 1, wherein the groups of windings are overlapping groups of windings.

20. An electrical apparatus according to claim 1, wherein the electrical apparatus is a multiphase apparatus and each group of windings is a different phase.

21. An electrical apparatus according to claim 1, wherein the separator defines a plurality of air gaps between the groups of windings.

22. An electrical apparatus according to claim 21, wherein the air gaps are sufficient to ensure the required electrical separation of the groups of windings.

23. A separator which provides and electrically insulating layer between groups of windings in an electrical apparatus, the separator comprising a matrix of interconnected rods, the separator further comprising a tag which holds the separator in position while a group of windings is being formed on the separator.

24. A separator according to claim 23, wherein the tag carries an adhesive.

25. A separator according to claim 23, wherein the tag is connected to the separator by means of a flexible joint.

26. A separator according to claim 23, wherein the tag is formed integrally with a rod.

27. A separator according to claim 23, constructed from a plastics material.

28. A method of winding an electrical apparatus, the electrical apparatus including a plurality of groups of windings at different electrical potentials, the method comprising inserting a separator between groups of windings so as to provide an electrically insulating layer between groups of windings at different electrical potentials, the separator comprising a matrix of interconnected rods which defines a plurality of cells in two directions.

29. A method according to claims 28, the method comprising windings a first group of windings, placing the separator on the first group of windings, and then winding a second group of windings on the separator.

* * * * *